Patented Dec. 20, 1938

2,140,713

UNITED STATES PATENT OFFICE 2,140,713

ADDITION PRODUCTS OF ACETYLENE AND ALCOHOL AND PROCESS OF PRODUCING THEM

Julius A. Nieuwland, George F. Hennion, and Donald B. Killian, Notre Dame, Ind., assignors to E. I. du Pont de Nemours & Company, Wilmington, Del., a corporation of Delaware No Drawing. Application March 21, 1936, Serial No. 70,110

31 Claims. (Cl. 260—515)

This invention relates to the addition of aliphatic hydroxy compounds to hydrocarbon or alkoxy hydrocarbon substituted acetylenes. More particularly it relates to the use in such addition reactions of a novel boron fluoride catalyst and to the catalyst itself. Still more particularly the invention relates to the novel addition products so obtained.

It has been shown in U. S. Letters Patent Nos. 1,824,963 and 1,907,560 that acetylene may be condensed with alcohols and glycols in the presence of mercuric oxide and boron fluoride or fluoboric acid. It has also been shown by Jacobson, Dykstra and Carothers in the Journal of American Chemical Soc. 56, 1169 (1934) that one mole of alcohol may be added to vinylacetylene at 100° C. in the presence of sodium methoxide to yield 4-methoxy-2-butine.

It is an object of this invention to prepare alkoxy derivatives of aliphatic hydrocarbons. A further object is to synthesize ketals and alkoxyketals through the addition of both mono- and polyhydric alcohols to substituted acetylenes. A still further object is to prepare 2,2,4-trialkoxybutanes and their homologues through addition of alcohols to vinylacetylene and its homologues. A still further object is to prepare and use a novel boron fluoride catalyst in this reaction. Other objects will appear hereinafter.

It has now been found that these objects may be accomplished by reacting substituted acetylenes of the general formula $RC\equiv CR'$, in which R and R' are hydrogen, hydrocarbon radicals, or alkoxy substituted hydrocarbon radicals but in which R and R' are never both hydrogen, with mono- or polyhydric alcohols, thus

It will be noted that whereas when R and R' in the above equation are both hydrogen (i. e., when the compound is acetylene, itself) acetals are obtained, when R and R' are not both hydrogen ketals are obtained. In general, the lower normal alcohols when reacted with acetylenes containing no other unsaturation, yield products which are readily isolated in the monomeric state but the difficulties encountered in isolating monomeric addition products increase as the molecular weight of the alcohol used is increased, particularly where branched chain alcohols are used. The difficulties encountered in isolating monomeric products likewise increase with an increase in the number of unsaturated bonds present in the acetylenic compound. Unless special care is exercised the reaction products, obtained when using higher alcohols, particularly branched chain alcohols or acetylenes containing more unsaturation than a single acetylenic bond, are, in general, polymeric and monomeric products can be isolated only in very low yield or not at all. In these cases, the alcohols react vigorously but carry the reaction beyond the ketal stage, giving polymeric materials with a wide boiling range or even resins, but it is nevertheless possible to isolate monomers from these reaction products if proper precautions are observed.

The method of this invention has been found to be applicable not only when R and R' in the above equation are saturated hydrocarbon radicals, but also when one or both are unsaturated and especially when one is a vinyl group or a homologue of the vinyl group and is so attached that unsaturation in the compound is conjugated.

When this invention is applied to vinyl acetylene and its homologues, all of which contain conjugated unsaturation, maximum alcohol addition, namely, the addition of three moles, is obtained, conjugate unsaturation favoring the addition, particularly when the new boron fluoride catalyst, described hereinafter, is used, to such an extent that the ethylenic bond is saturated as well as the acetylenic bonds. However, even when R and/or R' are unsaturated it has, in general, been found that maximum addition of alcohol is not obtained if the unsaturation is not conjugated. The overall reaction as applied to vinyl acetylenes may be formulated as follows:

As catalysts for these addition reactions, boron fluoride or any of its equivalents such as the ether complex, $(C_2H_5)_2O.BF_3$, the dihydroxyfluoboric acid complex, $H_3BO_2F_2.BF_3$, or dihydroxyfluoboric acid, itself, $H_3BO_2F_2$, may be used in conjunction with mercuric oxide. A preferred form of the invention, however, involves the use of a novel catalyst, referred to above. This novel catalyst is obtained by adding a small amount of trichloracetic acid to a boron fluoride-mercuric oxide catalyst.

The invention will be better understood by consideration of the following examples, which are intended, however, to be construed as illustrative only and not as limiting the scope of the invention.

*Example I*

The catalyst was prepared by heating 5 grams of red mercuric oxide, 2 cc. of $(C_2H_5)_2O.BF_3$ (prepared according to Nieuwland et al., J. Amer. Chem. Soc. 56 1130 (1934) and 55 2858 (1933)) and 2 cc. of methanol. To this was added 64 grams of methanol and the mixture was placed in a 2 liter, 3-necked flask equipped with an inlet tube for ethyl-acetylene, a mercury sealed stirrer and a low temperature reflux condenser cooled with liquid ammonia. Ethylacetylene was passed directly into the reaction mixture maintained at 40° C.; after stirring for 2 hours the contents of the flask were mixed with 5 grams of anhydrous potassium carbonate and fractionated at 100 mm. pressure, collecting 40 grams of 2,2-dimethoxybutane boiling at 48–50° C. at 100 mm. pressure.

*Example II*

A catalyst was prepared by absorbing 1.5 grams of boron trifluoride in 5 cc. of absolute methanol, to this was then added 5 grams of red mercuric oxide and after a few minutes heating on a steam bath, the mixture was combined with 64 grams of methanol and used in the method described in Example I.

*Example III*

Example I was repeated using 2 cc. of dihydroxyfluoboric acid, $H_3BO_2F_2$ in place of the ether-boron fluoride compound in the preparation of the catalyst.

*Example IV*

Example I was repeated using 1.5 cc. of $H_3BO_2F_2.BF_3$ in place of the ether-boron fluoride complex compound in the preparation of the catalyst.

In each of these Examples II to IV the reaction and products are practically identical with those obtained in Example I. It will be found that the use of a slightly greater molar ratio of the dihydroxyfluoboric acid is essential to obtain the same speed of reaction as that obtained through the use of free boron fluoride or boron fluoride associated with ether or dihydroxyfluoboric acid.

*Example V*

The method of Example I was repeated reacting 34 grams of propylacetylene with 40 grams of methanol, using the usual catalyst at 35° C., giving 2,2-dimethoxypentane.

In the same manner, alcohols may be reacted with the homologous acetylenes, producing frequently some polymeric products in the case of the higher alcohols, but well defined products in the case of methanol and other lower molecular weight normal alcohols. The following table outlines the properties of some lower members of the series which have been prepared through the agency of the catalyst with methanol.

TABLE I

*Dimethoxyalkanes*

$RC(OCH_3)_2CH_3$

| R | B. P. (°C.) | Mm. | Density | $n_D$ |
|---|---|---|---|---|
| Methyl | 78–80 | 747 | 0.8448[20] | 1.3746[20] |
| Ethyl | 48–50 | 100 | 0.8535[28] | 1.3899[28] |
| n-Propyl | 30–31 | 15 | 0.8494[23] | 1.3986[23] |
| n-Butyl | 58–60 | 30 | 0.8536[25] | 1.4053[25] |
| n-Amyl | 74–75 | 27 | 0.8543[22] | 1.4122[22] |

*Example VI*

Fifteen grams of red mercuric oxide, 4.5 cc. of $(C_2H_5)_2O.BF_3$, 2 grams of C. P. trichloroacetic acid and 10 cc. of methanol were warmed together. To this was added 480 grams of methanol and the mixture was placed in a 3 liter, 3-necked flask equipped with an inlet tube for vinylacetylene, a mercury sealed stirrer and a low temperature reflux condenser. Vinylacetylene was passed into the reaction flask while cooling the flask in a water bath into which cold water is constantly run. 312 grams of vinylacetylene were passed into the reaction mixture with constant stirring in a period of three hours, during which time the catalyst was found to darken and settle as a sludge. The temperature of the bath was then raised to 50° C. and stirring was continued for another hour and at the end of this period, 10 grams of anhydrous potassium carbonate were added to the reaction product and stirring continued for 15 minutes. The sludge was allowed to settle and the supernatant liquid decanted and fractionated in vacuo through a suitable distilling column, collecting the product boiling at 63–65° C. at 25 mm. pressure. In one example 487 grams were obtained, corresponding to a 65% yield based on the methanol taken at the start. The product obtained was 2,2,4-trimethoxybutane, boiling 63–65° C. at 25 mm. pressure, $n_D^{25} 1.4082, d_{25} 0.9332$ When one mole of this trimethoxybutane was mixed with 20 cc. of water containing 1 cc. of conc. HCl, hydrolysis was rapid and after warming for a few minutes under a reflux, the acid was neutralized with solid potassium carbonate and the liquid product fractionated giving a 75% yield of 4-methoxy-2-butanone, boiling 139–140° C. at 745 mm., $n_D^{27} 1.4025, d_{27} 0.9821$ Using the above mercuric oxide-ether boron fluoride - trichloroacetic acid catalyst, ethyl, n-propyl, n-butyl, n-pentyl and n-hexyl alcohols were each added to butylacetylene and to amylacetylene. Phenylvinylacetylene may also be reacted with alcohols, particularly methanol and in the presence of the trichloroacetic acid promoted catalyst.

*Example VII*

Amylacetylene and ethylene glycol were condensed by a procedure similar to that used in Example I, giving the cyclic glycol ketal, 1-methyl-1-amyl-2,5-dioxole (75% yield) B. P. 180–181° C. at 745 mm., $n_D^{30} 1.4227, d_{30} 0.8984$ but in this case all of the glycol was added to the mixture and the amylacetylene was added dropwise at 60–70° C. The crude product was taken up in ether, washed with sodium carbonate solution, dried over calcium chloride and fractionated to obtain the pure product.

*Example VIII*

One gm. of the ether-boron fluoride compound described in Example I, 1 gm. of trichloracetic acid, 2 gms. of methanol and 3 gms. of mercuric oxide were warmed together momentarily and then added to 60 gms. of methanol (absolute) and the mixture placed in a flask equipped with a dropping funnel, stirrer and reflux condenser. n-Butylacetylene (82 gms.) was slowly added during a period of about 2 hours, at the end of which time the product was isolated in the manner described in Example I, giving 2,2-dimethoxyhexane, boiling 58–60° C. at 30 mm. pressure.

Example IX

Example VIII may be repeated using 110 gms. of 2-octine in place of the butylacetylene and the resulting product is 3,3-dimethoxyoctane.

Example X

Example VIII may be repeated using 84 gms. of 4-ethoxy-2-butine in place of the butylacetylene. The product obtained in this case is the same 2,2,4-trimethoxybutane obtained in Example VI from vinylacetylene in a similar manner.

Example VII illustrates the use of a polyhydric alcohol and shows that the present invention is broadly applicable to alcohols as a class, both mono- and polyhydric. Although methyl alcohol is preferred, other such as ethyl, propyl, butyl, amyl, hexyl, etc., can be used. The normal alcohols constitute a preferred class. Among the polyhydric alcohols glycerol may be mentioned in addition to ethylene glycol. The invention is, moreover, applicable to the reaction of a mixture of alcohols.

As the above equations, examples and general statements indicate, the present invention is applicable to a wide variety of acetylenes. As further examples of suitable acetylenes, the following may be mentioned in addition to those named above; divinylacetylene (showing a greater tendency to yield polymers than vinylacetylene), phenyl allyl acetylene (1-phenyl-4-pentene-1-yne), butyl allyl acetylene (1-nonene-4-yne), and the amyl allyl acetylenes. Suitable acetylenes may be represented by the following general formula: $RC \equiv CR'$ in which R and R' are hydrogen, hydrocarbon radicals, or alkoxy substituted hydrocarbon radicals, but in which R and R' are never both hydrogen.

A preferred form of the invention involves the addition of saturated alcohols of the general formula $R''(OH)_n$, wherein R'' is a saturated hydrocarbon radical and $n$ is a whole number less than 4 and in particular such compounds where $n$ is one, to vinylacetylene and in general to substituted acetylenes, of the type described, which contain conjugate acetylenic and olefinic linkages. R, R' and R'' may all three represent either straight chain or branched chain radicals but R'' is preferably a straight chain radical.

In the application of this invention, increased pressure and temperature increase the rate of reaction, but in general, the reaction is sufficiently rapid and more easily controlled at temperatures below 60° C. and at pressures very slightly above normal atmospheric. Temperatures in the neighborhood of room temperature and below may also be used.

Although the examples describe batch processes, the invention is susceptible of being carried out continuously. Suitable modifications of the processes described, to make them continuous, will be readily apparent to one skilled in the art.

It is generally desirable to agitate the reaction mass in order to obtain the most satisfactory results. This may be accomplished, for example, by the means disclosed in the specific illustrations above or by other suitable means.

The anhydrous potassium carbonate added serves not only to neutralize any acid present which might cause the ketals to decompose, but also probably has additional functions and at any rate assists in recovering the product. Its obvious equivalents such as sodium carbonate, for example, may be used in place of or along with it.

The product may usually be recovered by fractional distillation at a suitable pressure. Other modifications of the step in which the product is separated from the reaction mass have been disclosed. Any suitable method may be used.

In general boron fluoride catalysts, such as those mentioned above, are very efficient in promoting the reactions described. A very satisfactory catalyst is that described in Example VI. This catalyst is described, herein, for the first time and, in fact, it has been found that the new catalyst consisting, broadly, of mercuric oxide and boron fluoride or any of its equivalents together with a small amount of trichloroacetic acid is very effective in the process of this invention.

The proportions of the various components of the catalysts used may be varied rather widely as indicated by the examples, which give several preferred embodiments. The catalyst is preferably prepared by dissolving the components, (preferably the boron fluoride compound, mercuric oxide and trichloracetic acid) in a small amount of the alcohol to be used or other alcohol if desired (the amount being about equal in weight to the mercuric oxide) and then warming them together momentarily before adding the desired quantity of the alcohol to be reacted and the acetylene compound.

The ratios of catalyst to reactants given illustrate satisfactory proportions. Others may be employed, however, if desired so that considerable variation from the specific illustrations is contemplated.

Although no particular proportions of reactants need be present in order to obtain the desired reaction, the substituted acetylene is usually added to the alcohol in amounts less than the theoretical quantity required to react with the alcohol present. The process may, nevertheless, be carried out with an excess of the acetylene.

In general, monomeric products can be readily isolated from the reaction mass where methanol and other lower molecular weight normal alcohols are the alcohols used. Similar products can also be obtained from ethylene glycol and glycerol. In many cases, however, particularly in the case of the higher monohydric alcohols or the branched chain alcohols or where highly unsaturated acetylenes are used, the principal product produced is a polymer unless means are employed to inhibit polymerization. In any event reaction is obtained when the process is carried out as hereinbefore set forth and a product is obtained even though, in some cases, polymers predominate to such an extent that little or no monomer can be isolated.

When the compound to be reacted with the alcohol contains no olefinic linkages and only a single acetylenic linkage or when the olefinic and acetylenic linkages are not conjugated, in general, two hydroxyl groups on the same or different alcohols condense with the acetylenic linkage and none with the olefinic linkage. When there is additional unsaturation, however, which is conjugated with the acetylenic linkage as when a vinyl group is present and the olefinic linkage is conjugated with the acetylenic linkage, it has been found that an additional hydroxyl may be added. Thus, with vinylacetylene, trialkoxybutanes are obtained, such, for example, as the trimethoxy butane disclosed in Example VI.

The trialkoxy butanes prepared by the process of the present invention, particularly, the trimethoxy butane are very useful as starting materials in the synthesis of other new chemical compounds. Thus, as in Example VI, the trimethoxy-butanes hydrolyze in the presence of a small amount of acid as a catalyst to form 4-alkoxy-2-butanones, disclosed as new products in United States Patent No. 2,010,828. Moreover, according to the process disclosed in a copending application of Carothers and Dykstra, Serial No. 31,092, filed July 12, 1935, these trialkoxybutanes may be treated to yield a wide variety of new and useful chemical compounds.

The polymeric materials resulting from the present process are quite varied in character. Both liquids and resins are obtained. The resins may be subjected to various known treatments to yield useful products.

The boron fluoride-mercuric oxide catalyst activated through the addition of trichloroacetic acid is a new catalyst and composition of matter. It has been found to be exceptionally effective in the present process, particularly, in promoting the addition of three moles of a mono-hydric alcohol to vinylacetylene.

It is thus apparent that many widely different embodiments of this invention may be made without departing from the spirit and scope thereof and, therefore, it is not intended to be limited except as indicated in the appended claims.

We claim:

1. The process which comprises reacting alcohols with compounds of the general formula $RC \equiv CR'$ in which R and R' are members of the group consisting of hydrogen and hydrocarbon radicals, but in which R and R' are never both hydrogen, in the presence of mercuric oxide and a boron fluoride affording compound.

2. The process which comprises reacting alcohols with compounds of the general formula $RC \equiv CR'$ in which R and R' are members of the group consisting of hydrogen and hydrocarbon radicals, but in which R and R' are never both hydrogen, in the presence of mercuric oxide, a boron fluoride affording compound, and trichloroacetic acid.

3. The process which comprises reacting alcohols with compounds of the general formula $RC \equiv CR'$ in which R and R' are members of the group consisting of hydrogen and hydrocarbon radicals, but in which R and R' are never both hydrogen, in the presence of mercuric oxide and a boron fluoride affording compound of the group consisting of boron fluoride, ether-boron fluoride complex, dihydroxy fluoboric acid and boron fluoride-dihydroxy fluoboric acid addition product.

4. The process which comprises reacting alcohols with compounds of the general formula $RC \equiv CH$ in which R is a hydrocarbon radical, in the presence of mercuric oxide and a boron fluoride affording compound of the group consisting of boron fluoride, ether-boron fluoride complex, dihydroxy fluoboric acid and boron fluoride-dihydroxy fluoboric acid addition product.

5. A process as described in claim 4 characterized in that R is a radical of the structural formula $R'—CH=CH—$ in which R' is a member of the group consisting of hydrogen and hydrocarbon radicals and in that the alcohol is saturated.

6. A process as described in claim 4 characterized in that R is a radical of the structural formula $R'—CH=CH—$ in which R' is a member of the group consisting of hydrogen and hydrocarbon radicals and in that the alcohol is a lower saturated primary monohydric alcohol.

7. A process as described in claim 4 further characterized in that trichloroacetic acid is added to the catalyst composition prior to reaction.

8. A process as described in claim 4 further characterized in that R is an open-chain saturated radical and in that the alcohol is saturated.

9. A process as described in claim 4 further characterized in that R is an open-chain saturated radical and in that the alcohol is saturated, and in that trichloroacetic acid is added to the catalyst composition prior to reaction.

10. A process as described in claim 4 further characterized in that R is a radical of the structural formula $R'—CH=CH—$ in which R' is a member of the group consisting of hydrogen and hydrocarbon radicals and in that the alcohol is saturated, and in that trichloroacetic acid is added to the catalyst composition prior to reaction.

11. A process as described in claim 4 further characterized in that R is an open-chain saturated radical and in that the alcohol is a lower saturated primary monohydric alcohol.

12. A process as described in claim 4 further characterized in that R is an open-chain saturated radical and in that the alcohol is a lower saturated primary monohydric alcohol, and in that trichloroacetic acid is added to the catalyst composition prior to reaction.

13. A process as described in claim 4 further characterized in that R is a radical of the structural formula $R'—CH=CH—$ in which R' is a member of the group consisting of hydrogen and hydrocarbon radicals and in that the alcohol is a lower saturated primary monohydric alcohol, and in that trichloroacetic acid is added to the catalyst composition prior to reaction.

14. A process as described in claim 4 further characterized in that R is a hydrocarbon radical of the formula $C_nH_{2n-1}$ and in that the alcohol is a lower saturated primary monohydric alcohol.

15. The process which comprises reacting ethylacetylene with an excess of methanol in the presence of mercuric oxide and ether boron fluoride complex at a temperature of about 40° C. and then separating from the reaction mass 2,2-dimethoxybutane.

16. The process which comprises reacting vinylacetylene with methanol in the presence of mercuric oxide, ether boron fluoride complex and trichloroacetic acid, then warming to about 50° C. to complete the reaction and thereafter separating from the reaction mass 2,2,4-trimethoxybutane.

17. An addition product of a compound of the general formula $RC \equiv CH$ in which R is an unsaturated aliphatic hydrocarbon radical containing more than two carbon atoms, and an alcohol obtainable by reacting the compound with the alcohol in the presence of mercuric oxide and a boron fluoride affording compound.

18. The process which comprises reacting a low molecular weight saturated primary monohydric alcohol with monovinylacetylene in the presence of mercuric oxide and a boron fluoride affording compound of the group consisting of boron fluoride, ether-boron fluoride complex, dihydroxy fluoboric acid and boron fluoride-dihydroxy fluoboric acid addition product.

19. The process which comprises reacting a low molecular weight saturated primary monohydric alcohol with monovinylacetylene in the presence of mercuric oxide, trichloroacetic acid and a boron fluoride affording compound of the group consisting of boron fluoride, ether-boron fluoride complex, dihydroxy-fluoboric acid and boron fluoride-dihydroxy fluoboric acid addition product.

20. The process which comprises reacting methyl alcohol with a compound of the general formula $RC{\equiv}CH$ in which R is a lower straight-chain saturated hydrocarbon radical in the presence of mercuric oxide and a boron fluoride affording compound of the group consisting of boron fluoride, ether-boron fluoride complex, dihydroxy fluoboric acid and boron fluoride-dihydroxy fluoboric acid addition product.

21. The process which comprises reacting methyl alcohol with a compound of the general formula $RC{\equiv}CH$ in which R is a lower straight-chain saturated hydrocarbon radical in the presence of mercuric oxide, trichloracetic acid, and a boron fluoride affording compound of the group consisting of boron fluoride, ether-boron fluoride complex, dihydroxy fluoboric acid and boron fluoride-dihydroxy fluoboric acid addition product.

22. The process which comprises reacting methyl alcohol with monovinylacetylene in the presence of mercuric oxide and a boron fluoride affording compound of the group consisting of boron fluoride, ether-boron fluoride complex, dihydroxy fluoboric acid and boron fluoride-dihydroxy fluoboric acid addition product.

23. The process which comprises reacting methyl alcohol with monovinylacetylene in the presence of mercuric oxide, trichloracetic acid and a boron fluoride affording compound of the group consisting of boron fluoride, ether-boron fluoride complex, dihydroxy fluoboric acid and boron fluoride-dihydroxy fluoboric acid addition product.

24. The process which comprises reacting methyl alcohol with monovinylacetylene in the presence of mercuric oxide and ether-boron fluoride complex.

25. The process which comprises reacting methyl alcohol with monovinylacetylene in the presence of mercuric oxide, trichloroacetic acid and ether-boron fluoride complex.

26. As a new composition of matter, mercuric oxide and a boron fluoride containing composition activated by trichloroacetic acid.

27. As a new composition of matter, ether-boron fluoride and mercuric oxide activated by trichloracetic acid.

28. Compounds of the general formula $$RC(OCH_3)_2CH_3$$

in which R is a saturated open-chain hydrocarbon radical containing at least two carbon atoms.

29. An addition product of a compound of the general formula $RC{\equiv}CR'$ in which R and R' are members of the group consisting of hydrogen and saturated aliphatic hydrocarbon radicals but in which R and R' are never both hydrogen, and a single alcohol containing more than two carbon atoms, obtainable by reacting the compound with the alcohol in the presence of mercuric oxide and a boron fluoride affording compound.

30. An addition product of a compound of the general formula $R{-}CH{=}CH{-}C{\equiv}CH$ in which R is a hydrocarbon radical and an alcohol obtainable by reacting the compound with the alcohol in the presence of mercuric oxide and a boron fluoride affording compound.

31. An addition product as described in claim 30 further characterized in that R is a lower saturated aliphatic hydrocarbon radical and in that the alcohol is a lower saturated primary monohydric alcohol.

JULIUS A. NIEUWLAND.
GEORGE F. HENNION.
DONALD B. KILLIAN.

---

CERTIFICATE OF CORRECTION.

Patent No. 2,140,713.  December 20, 1938.

JULIUS A. NIEUWLAND, ET AL.

It is hereby certified that error appears in the printed specification of the above numbered patent requiring correction as follows: Page 3, first column, line 8, Example X, for "4-ethoxy-2-butine" read 4-methoxy-2-butine; and that the said Letters Patent should be read with this correction therein that the same may conform to the record of the case in the Patent Office.

Signed and sealed this 31st day of January, A. D. 1939.

Henry Van Arsdale (Seal)   Acting Commissioner of Patents.

ride-dihydroxy fluoboric acid addition product.

20. The process which comprises reacting methyl alcohol with a compound of the general formula RC≡CH in which R is a lower straight-chain saturated hydrocarbon radical in the presence of mercuric oxide and a boron fluoride affording compound of the group consisting of boron fluoride, ether-boron fluoride complex, dihydroxy fluoboric acid and boron fluoride-dihydroxy fluoboric acid addition product.

21. The process which comprises reacting methyl alcohol with a compound of the general formula RC≡CH in which R is a lower straight-chain saturated hydrocarbon radical in the presence of mercuric oxide, trichloracetic acid, and a boron fluoride affording compound of the group consisting of boron fluoride, ether-boron fluoride complex, dihydroxy fluoboric acid and boron fluoride-dihydroxy fluoboric acid addition product.

22. The process which comprises reacting methyl alcohol with monovinylacetylene in the presence of mercuric oxide and a boron fluoride affording compound of the group consisting of boron fluoride, ether-boron fluoride complex, dihydroxy fluoboric acid and boron fluoride-dihydroxy fluoboric acid addition product.

23. The process which comprises reacting methyl alcohol with monovinylacetylene in the presence of mercuric oxide, trichloracetic acid and a boron fluoride affording compound of the group consisting of boron fluoride, ether-boron fluoride complex, dihydroxy fluoboric acid and boron fluoride-dihydroxy fluoboric acid addition product.

24. The process which comprises reacting methyl alcohol with monovinylacetylene in the presence of mercuric oxide and ether-boron fluoride complex.

25. The process which comprises reacting methyl alcohol with monovinylacetylene in the presence of mercuric oxide, trichloroacetic acid and ether-boron fluoride complex.

26. As a new composition of matter, mercuric oxide and a boron fluoride containing composition activated by trichloroacetic acid.

27. As a new composition of matter, ether-boron fluoride and mercuric oxide activated by trichloracetic acid.

28. Compounds of the general formula $$RC(OCH_3)_2CH_3$$

in which R is a saturated open-chain hydrocarbon radical containing at least two carbon atoms.

29. An addition product of a compound of the general formula RC≡CR' in which R and R' are members of the group consisting of hydrogen and saturated aliphatic hydrocarbon radicals but in which R and R' are never both hydrogen, and a single alcohol containing more than two carbon atoms, obtainable by reacting the compound with the alcohol in the presence of mercuric oxide and a boron fluoride affording compound.

30. An addition product of a compound of the general formula R—CH=CH—C≡CH in which R is a hydrocarbon radical and an alcohol obtainable by reacting the compound with the alcohol in the presence of mercuric oxide and a boron fluoride affording compound.

31. An addition product as described in claim 30 further characterized in that R is a lower saturated aliphatic hydrocarbon radical and in that the alcohol is a lower saturated primary monohydric alcohol.

JULIUS A. NIEUWLAND.
GEORGE F. HENNION.
DONALD B. KILLIAN.

CERTIFICATE OF CORRECTION.

Patent No. 2,140,713.   December 20, 1938.

JULIUS A. NIEUWLAND, ET AL.

It is hereby certified that error appears in the printed specification of the above numbered patent requiring correction as follows: Page 3, first column, line 8, Example X, for "4-ethoxy-2-butine" read 4-methoxy-2-butine; and that the said Letters Patent should be read with this correction therein that the same may conform to the record of the case in the Patent Office.

Signed and sealed this 31st day of January, A. D. 1939.

Henry Van Arsdale (Seal)   Acting Commissioner of Patents.